United States Patent [19]

Kimmel et al.

[11] B 4,007,401
[45] Feb. 8, 1977

[54] CURRENT SENSITIVE CIRCUIT PROTECTION SYSTEM

[75] Inventors: Donald S. Kimmel, Monroeville; Wardell Gary; Glenn R. Taylor, both of Beaver, all of Pa.

[73] Assignee: Westinghouse Electric Corporation, Pittsburgh, Pa.

[22] Filed: Sept. 9, 1974

[21] Appl. No.: 504,405

[44] Published under the second Trial Voluntary Protest Program on April 13, 1976 as document No. B 504,405.

[52] U.S. Cl. .................. 317/36 TD; 317/33 SC; 340/253 A; 317/13 R
[51] Int. Cl.² .................. H02H 3/08; H02H 7/08
[58] Field of Search ....... 317/36 TD, 33 SC, 141 S, 317/47, 48, 27 R; 307/293; 340/40, 253 R, 253 A

[56] References Cited

UNITED STATES PATENTS

| 3,248,610 | 4/1966 | Faglie | 317/47 |
| 3,296,495 | 1/1967 | Paddison | 317/47 |
| 3,327,170 | 6/1967 | Sonnemann | 317/47 |
| 3,363,185 | 1/1968 | Sanderson et al. | 340/40 |
| 3,562,595 | 2/1971 | Swanson | 317/141 S |
| 3,602,783 | 8/1971 | Engle | 317/36 TD |
| 3,611,037 | 10/1971 | Watson | 317/36 TD |
| 3,713,005 | 1/1973 | Engel | 317/36 TD |
| 3,784,846 | 1/1974 | Krick | 307/293 |
| 3,818,275 | 6/1974 | Shimp | 317/36 TD |
| R27,393 | 6/1972 | Aselman, Jr. | 317/36 TD |

Primary Examiner—J D Miller
Assistant Examiner—Patrick R. Salce
Attorney, Agent, or Firm—M. J. Moran

[57] ABSTRACT

An electrical control system which is utilized for opening a circuit breaker which is connected to a load to be protected. The control system comprises a unitary current sensor module which senses current flowing in the load to be protected. The sensor is adapted to have connected at the output thereof a load resistor which is capable of cooperating with the sensed current to provide a range of voltage over which a set of plug-in modules are operable to either provide an indication of characteristics associated with the current or the load or to provide an output function which is adapted to open the circuit breaker. The load resistor is replaceable with other load resistors so that the voltage range may be maintained even though the expected value of currents to be sensed by the sensor may change depending upon the load and other circuit characteristics.

11 Claims, 5 Drawing Figures

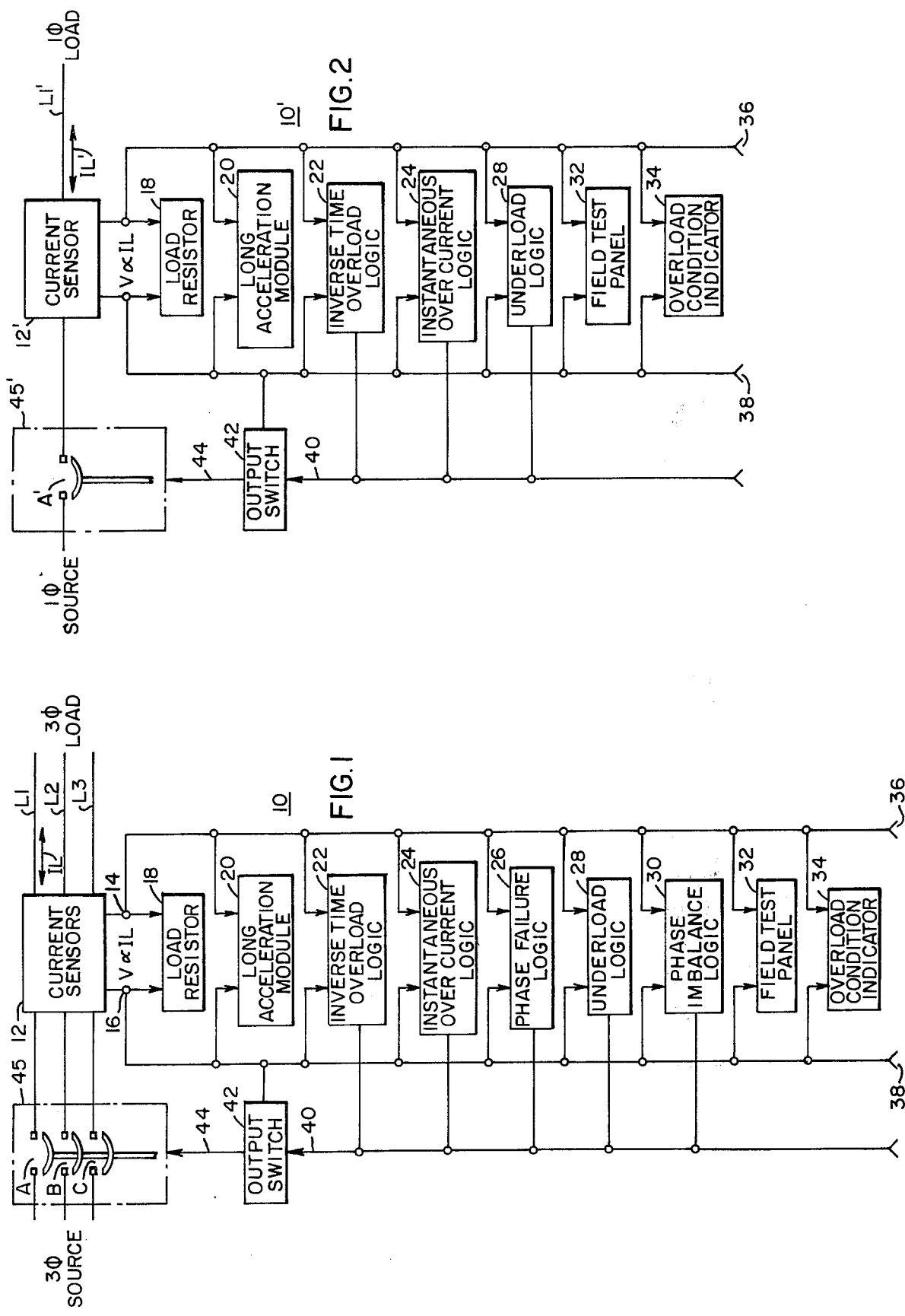

CURRENT SENSITIVE CIRCUIT PROTECTION SYSTEM

CROSS-REFERENCE TO RELATED APPLICATION

Certain inventions related to those disclosed in the present application are disclosed and claimed in co-pending application Ser. No. 504,404 filed concurrently by W. Gary and G. R. Taylor, and copending application Ser. No. 405,198 filed Oct. 10, 1973 by Wardell Gary and Emroy W. Lange, all of which are assigned to the same assignee as the present application.

BACKGROUND OF THE INVENTION

This invention relates generally to the electrical control systems for controlling the action of a circuit breaker and it relates specifically to modular control systems utilizing plug-in modules which are universally adaptable for use over a wide range of current values.

In the past it has been known to provide circuit breaker control systems utilizing a multitude or a number of current and voltage sensors to control functions such as inverse time overload to thereby cause a circuit breaker to trip. Sometimes a separate circuit breaker is provided for each function to be controlled. Sometimes it is necessary to provide a multitude of current sensors each adapted to sense different ranges of currents or different values of currents or different rates of change of currents or voltage to in turn supply that information to a logic device which in turn can cause a certain circuit breaker to trip. Devices of this kind are described in U.S. Pat. No. 3,713,005 entitled "Circuit Breaker Including Improved Overcurrent Protective Device" issued on Jan. 23, 1973 to J. C. Engel and assigned to the same assignee as the assignee of the present invention, and in technical bulletin 980 of June 1972 entitled "Phase Failure Relays" by the Wilmar Electronics, Inc. of 2103 Border Avenue, Torrance, California and in a technical bulletin 948–B1 of June 1971, entitled "Overload Relays" by the Furnas Electric Company of Batavia, Illinois. It would be advantageous if a universal control system for a circuit breaker could be found which is utilizable over a wide range of circuit currents and voltage conditions and which is adaptable to utilize plug-in logic modules to control or cause the circuit breaker to trip in response to a variety of different kinds of circuit functions.

SUMMARY OF THE INVENTION

In accordance with the invention an electrical circuit protective device is taught having a sensor means for sensing circuit current in an electrical circuit and providing an output current related to the circuit current. There is included a replaceable load resistor means connectable to the last-mentioned output for converting the current into a voltage the value of which is variable within a predetermined range regardless of the value of the circuit current. There is also provided a replaceable module which is connectable in parallel circuit relationship with the load resistor means which is capable of initiating a circuit breaker trip function. The module is operable over the predetermined range of voltage. There is also provided a circuit breaker trip means which is connected to the circuit module for opening the electrical circuit when the trip function occurs in the module.

In another embodiment of the invention, more than one of the previously described replaceable modules is provided in parallel circuit relationship with the load resistor means and with each other. The previously described modules may comprise an inverse time overload module, an instantaneous overcurrent module, a phase failure module, an underload logic module, a phase imbalance module, and in another embodiment of the invention a field test panel or an overload condition indicator, the latter two modules not having control over the circuit breaker but providing an indication of the status of the electrical circuit to be controlled.

BRIEF DESCRIPTION OF THE DRAWINGS

For a better understanding of the invention reference may be had to the preferred embodiment exemplary of the invention, shown in the accompanying drawings in which:

FIG. 1 shows a universal plug-in type control system for a circuit breaker for a three-phase electrical system;

FIG. 2 shows a system similar to that shown in FIG. 1 but for a one-phase electrical system;

DESCRIPTION OF THE PREFERRED EMBODIMENTS

Figure 3:
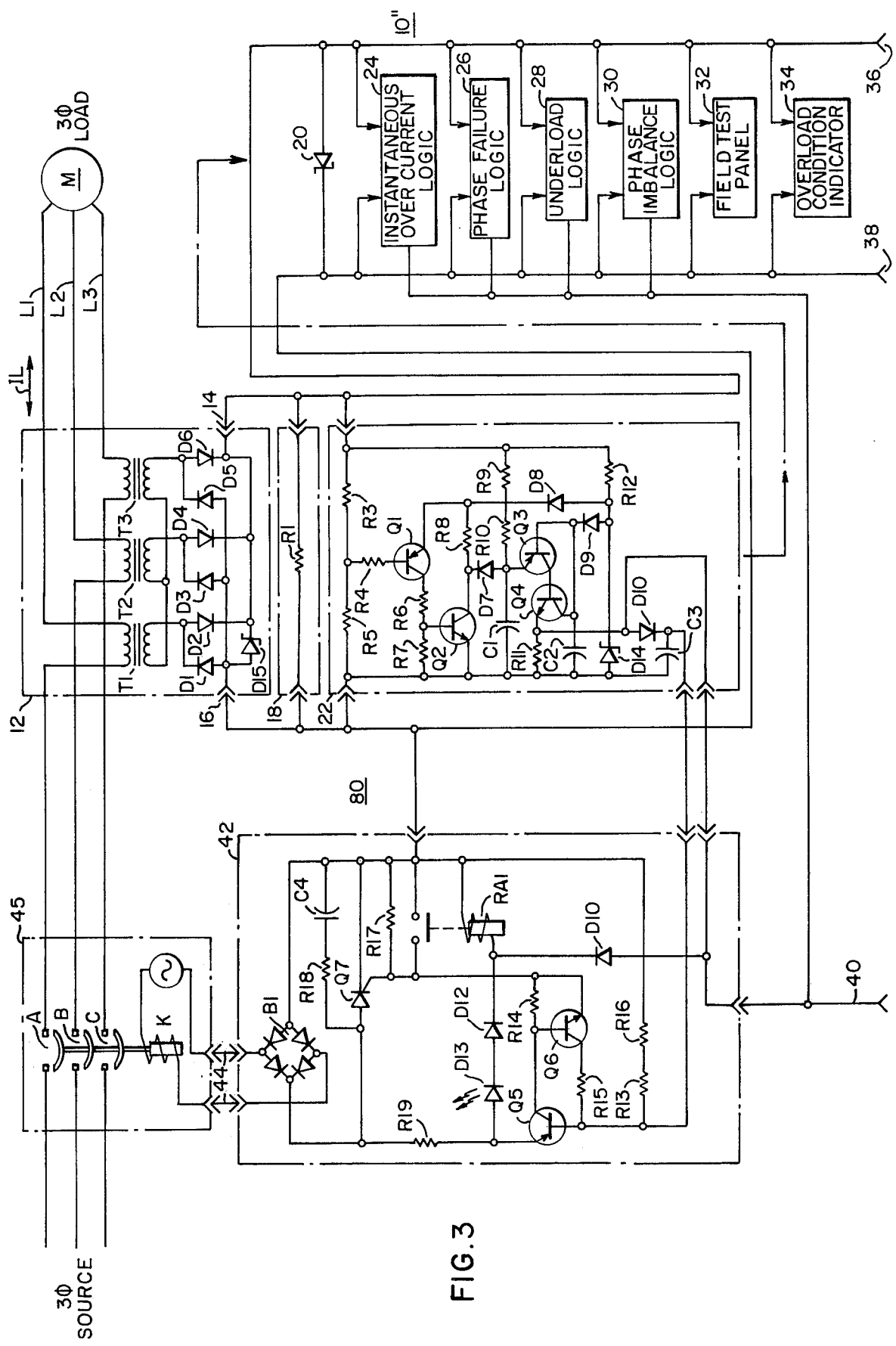
FIG. 3 shows a circuit block diagram of a portion of the system shown in FIG. 1.

Referring now to the drawings and FIG. 1 in particular, a circuit protective system 10 is shown. The circuit protective system 10 comprises in this embodiment of the invention a three-phase line having leads, conductors or lins L1, L2 and L3 which are connected on the right to a three-phase load and which are connected on the left to a three-phase source of electrical power. Intermediate to the load and the source of electrical power is a current sensor 12 and a serially connected circuit breaker or motor starter appartaus 45. In the embodiment of FIG. 1 a single current IL is shown flowing in the line L1. It is to be understood that other currents may and usually do flow in the other lines L2 and L3 and the other currents may be related to the current IL. The choice of current IL is merely made for the purpose of simplicity of illustration.

There are two output terminals for the current sensor 12, which terminals are designated 14 and 16. Shown connected to the terminals 14 and 16 is a load resistor module 18. The load resistor module 18 comprises a resistive element which is connectable across the terminals 14 and 16 to convert the current IL into a utilizable voltage V which may be utilized by other circuit protective means in the apparatus of FIG. 1. Connected in parallel circuit relationship with the load resistor module 18 may be a long acceleration module 20, an inverse time overload logic module 22, an instantaneous overcurrent logic module 24, a phase failure logic module 26, an underload logic module 28, a phase imbalance logic module 30, a field test panel 32, and a motor in reverse indicator 34 if the load to be protected includes a motor. Numerous other combinations of logic modules may be provided in the same parallel circuit relationship as shown with respect to the elements 20 through 34 of FIG. 1. The remaining elements would be connected to terminals 38 and 36 for example. It is to be understood that any of the modules 20 through 34 may be removed or replaced and other modules may be added provided the parallel circuit relationship with the load resistor module 18 is maintained. Each of the previously described modules 22 through 30 for example have an output terminal which is connectable to a line 40 which in turn is connected to an output switch 42 which in turn is connected to the previously described circuit breaker means or circuit interrupter means 45. In the preferred embodiment of the invention, the field test panel 32 and the motor in reverse indicator panel 34 have no output to the line 40. In the preferred embodiment of the invention the voltage V at the output terminals 14 and 16 is proportional to the current IL. If the expected raise of current IL becomes significantly large a different load resistor may be disposed across terminals 14 and 16 to make the voltage between the terminals 14 and 16 approximately the same even though the current IL is significantly larger. The same would apply if the rated current range IL is significantly lower. This means that the elements 20 through 34 need not be changed as they are sensitive only to the voltage V. It also means that the output switch 42 need not be changed. In a typical embodiment of the invention the long acceleration module 20 will perform a function which will be described hereinafter. The inverse time overload logic module 22 provides what is typically known as the $I^2t = K$ function as is well known in the art. The instantaneous overcurrent logic module 24 performs the instantaneous tripping function that is well known in the art and which is related to extremely high values of overload current or short circuit current. The phase failure logic 26 provides an indication that one of the phases or lines L1, L2 or L3 has failed and provides adequate switching in accordance therewith. The underload logic module 28 provides an indication that the load has dropped below what is considered to be a safe predetermined value of current IL. The phase imbalance logic module 30 provides an indication and an automatic signal to the output switch 42 if the currents flowing in the lines L1, L2 and L3 become significantly disproportionate to one another. The field test panel 32 provides an output indication of current IL and other useful output functions. The motor in reverse indicator 34 provides a function typified by its name, namely an indication that motor which may be attached to the three-phase load is in a reverse wired polarity.

Referring now to FIG. 2 there is another protective device 10' shown for utilization where there is a single phase or DC load and source. In this embodiment of the invention there is provided a single phase or DC line L1' which provides power to a single phase or DC load on the right from a single phase or DC source on the left. There is also provided a single contact circuit breaker or motor starter apparatus 45' having a contact A therein for interrupting the current IL'. The current sensing means 12' may be the same as shown in FIG. 1. The load resistor module 18' is different from the load resistor module 18 shown in FIG. 1 if the range of current IL' is significantly different than the range of current IL shown in FIG. 1. However, the long acceleration module 20, the inverse time overload logic module 22, the instantaneous overcurrent logic module 24, the underload logic module 28, the field test panel 32 and the motor in reverse indicator 34 are or may be all the same as those corresponding modules shown in FIG. 1. This demonstrates the versatile use of the circuit protector apparatus. It will be noted that there is no phase failure logic module or phase imbalance logic module in this embodiment of the invention as those functions are typical of polyphase AC electrical apparatus. It will be also noted that the outputs of the modules 22, 24, and 28, for example, are connected to the line 40 which in turn is an input to the output switch 42 which in turn controls the line 44 causing the circuit breaker 45' to be actuated.

Referring now to FIG. 3, there is shown an embodiment of the invention for use with a three-phase line having a three-phase supply and controlling a motor M which is a three-phase load. In this embodiment of the invention the electrical and electronic elements comprising the current sensor 12, the load resistor module 18, the inverse time overload module 22, the output switch 42, the long acceleration module 20 and the circuit breaker 45 are shown in schematic form. Also shown in block diagram form are the previously described functional blocks 24, 26, 28, 30, 32 and 34 as well as the interconnecting terminals 38 and 36, the line 40 and the output line or lines 44. In this case, a current IL flowing in the line L1 is sensed by a transformer T1 in the current sensor 12. The resistor R1 shown in the module 18 comprises the load or motor current range determining resistor previously described. It is across this resistor that the output voltage V exists.

Resistors R9, R10 and capacitor C1 form the time delay network for the overload trip switch comprising transistors Q3 and Q4. The timing capacitor C1 is held at a discharged state until the motor is near an overload condition by the full load sense switch comprising transistors Q1 and Q2. The trip signal from the transistors Q3 and Q4 is held by the automatic reset delay network comprising elements C3, R13, and R16. The overload relay 80 is equipped with manual reset, relay RA1. Relay RA1 operates and is held on to prevent the motor starter 45 from actuating. The motor starter coil is controlled by the output series switch comprising SCR Q7 and bridge B1. The output series switch SCR Q7 is normally biased on by the reset control switch comprising transistors Q5 and Q6. When a trip signal appears, the reset control switch is turned off for a fixed time period.

The DC voltage proportional to line current IL that appears across R1 will be referred to in the following circuit description as the "input voltage".

Resistors R3 and R5 form a voltage divider that presents a fraction of the input voltage to base resistor R4 of transistor Q1. The input voltage corresponding to full load current may be 10 volts in a preferred embodiment of the invention. At input voltages below about 9.5 volts, the voltage at the emitter of Q1 is at least 0.7 volts above the voltage at the base thereof. Thus Q1 is biased on. The collector current of transistor Q1 flows through resistor R6 and into the base of transistor Q2. Transistor Q2 is therefore biased on, and time delay capacitor C1 is held to about 0.8 volts above ground.

When the input voltage rises above approximately 9.5 volts, the voltage at the emitter of transistor Q1 cannot rise above 7.7 volts because the Zener diode D14 clamps at about 8.4 volts (at the current levels permitted by series resistor R12). When the voltage at the junction of resistor R4, resistors R3 and R5 is not sufficiently below this latter value to allow Q1 to remain on and the collector current of Q1 ceases flowing through base resistor R6 and into transistor Q2. Thus Q2 turns off, and timing capacitor C1 begins to charge through resistors R9 and R10. Resistor R7 prevents undesired turn-on of Q2 due to high temperature reverse current leakage through the collector-base thereof. Diode D7 prevents C1 from being charged through resistors R12 and R8. Diode D8 prevents C1 from being robbed of charging current by the otherwise relatively low impedance path to ground of diode D7, resistor R8 and Zener diode D14.

When the full load sense switch Q1, Q2 turns off, the time delay capacitor C1 begins to charge through resistors R9 and R10. The rate of charge depends on the value of the input voltage: the greater the overload current IL, the faster capacitor C1 will charge. Trip signal switch Q3 and Q4 uses Zener diode D14 as a reference voltage device. As long as the voltage at the emitter of Q3 is less than the base voltage thereof, Q3 remains off. Transistor Q4 is also off, and the trip signal (voltage across R11) is zero. When the voltage at the emitter of Q3 (voltage across C1) exceeds by 0.7 volts the voltage on the base of Q3, the Q3 begins to turn on. Base-emitter current through Q4 begins to turn on Q4 and lower the collector-to-emitter voltage of Q4. The reduced voltage at the junction of the collector of Q4 and base of Q3 causes Q3 to turn on harder, thus producing the snap-action switch-on of the transistor device comprising transistors Q3 and Q4. The energy normally stored in capacitor C2, which is charged through resistor R12 and diode D9, is dumped or flows through Q4 by the sudden turn-on thereof. Most of the energy stored in C2 is dumped into two parallel paths: automatic reset delay capacitor C3, and relay coil RA1. Resistor R11 is relatively high in impedance compared to the other two parallel paths, but provides a path to ground for Q4 when Q4 is normally off. Diodes D10 and D11 isolate C3 and RA1 from each other.

When a trip signal charges reset delay capacitor C3, the reset control switch Q5, Q6 is turned off, and remains off until C3 discharges through reset delay resistors R13 and R16 to a value of about 2 volts or less. The ouput series SCR, Q7, which is normally gated on is also turned off for this time period.

Under normal conditions when 110 volts AC control voltage is applied to the starter coil K, the series SCR Q7 is gated on every half cycle. The full wave AC voltage (rectified by B1) appears across the anode to cathode of SCR Q7. When the voltage at the anode of Q7 rises to 2 volts or more, transistor Q5 turns on, provided the reset delay capacitor C3 is discharged. The collector current of Q5 flows through the base-emitter of Q6 and into the gate of SCR Q7. When SCR Q7 turns on, the anode-to-cathode voltage of Q7 drops to about 1.5 volts, and most of the AC voltage appears across the starter coil K.

When a trip signal has charged capacitor C3 to at least 3 volts or more, then at the beginning of the next half cycle, the base-emitter junction of transistor Q5 is reverse biased and Q5 does not turn on. Thus transistor Q6 is turned off, and no gate current is supplied to SCR Q7. As the AC voltage continues to rise, when the voltage at the emitter of Q5 reaches about 2½ to 3 volts, light-emitting diode or LED D13 and series diode D12 conduct. This prevents the voltage at the emitter of Q5 from rising further, and Q5 thus remains off. During the remaining portion of each half cycle, the voltage across Q7 continues to rise and then fall. This provides enough current through R19 and D13 to produce a visible indication that the overload 80 has caused starter 45 to open or trip. If the AC control voltage to the starter coil K is removed when the overload relay 80 trips (as in the case when the starter 45 is operated by a pushbutton and auxiliary contact on the starter, not shown), there will be no available voltage to operate the light emitting diode D13. When the start button is pushed, however, if the overload relay 80 is still in a tripped condition the LED D13 will turn on and illuminate.

Resistor R15 limits the collector current of Q6 to a reasonably low value, and resistor R14 prevents undesired turn-on of Q6 due to high temperature reverse leakage current through the collector-base of Q6. Resistor R17 helps prevent undesired turn-on of SCR Q7 due to high temperature leakage or transient noise. Resistor R18 and capacitor C4 provide a snubber network to protect SCR Q7 against actuation thereof by excessive dv/dt.

If the circuit is equipped with a manual reset, then relay coil RA1 is energized by the current through D12 and D13 and also by the trip signal through D10. If the voltage to the starter coil K is applied through a pushbutton and an auxiliary contact of the starter (not shown), the voltage applied to the SCR Q7 could be removed too soon to energize the coil RA1 in the event the auxiliary contact operates too quickly. This condition would cause the reset circuit to operate in the automatic mode, and the motor M could be restarted in a few minutes by pushing the start button, not shown (without requiring operation of the reset button). For this reason RA1 is energized by both the trip signal through D10 and the current supplied through R19, D13 and D12.

When the relay coil RA1 is actuated, the contacts close and short the gate of SCR Q7 to the cathode, turning Q7 off. If the reset delay capacitor C3 has discharged, the output series SCR Q7, will turn on again when voltage is re-applied to the starter coil K. If the manual reset mechanism is operated before the reset delay network has timed out, the relay RA1 contacts will open, but they will be reclosed by the coil of RA1 if the start button (not shown) is pushed before the reset delay time had elapsed. The manual reset mechanism (not shown) must then be operated again before the start button can actuate the starter 45. If the manual reset mechanism is operated before the reset delay has timed out, but the start button is not pushed until after the reset delay time has elapsed, then the starter 45 will operate. In any event, the starter 45 cannot be energized until three conditions are met: the manual reset mechanism has been operated at least once; the reset delay time has expired; and the start button (not shown) is pushed or actuated.

It can be seen that the trip signal is provided by way of line 40 to the output module 42 and then by way of lines 44 to the circuit breaker apparatus 45 where the contacts A, B and C are opened under appropriate conditions. It can be seen that any of the devices 20, 22, 24, 26, 28 and 30 can provide an output signal which can independently provide a signal on line 40 to cause tripping.

Figure 4:
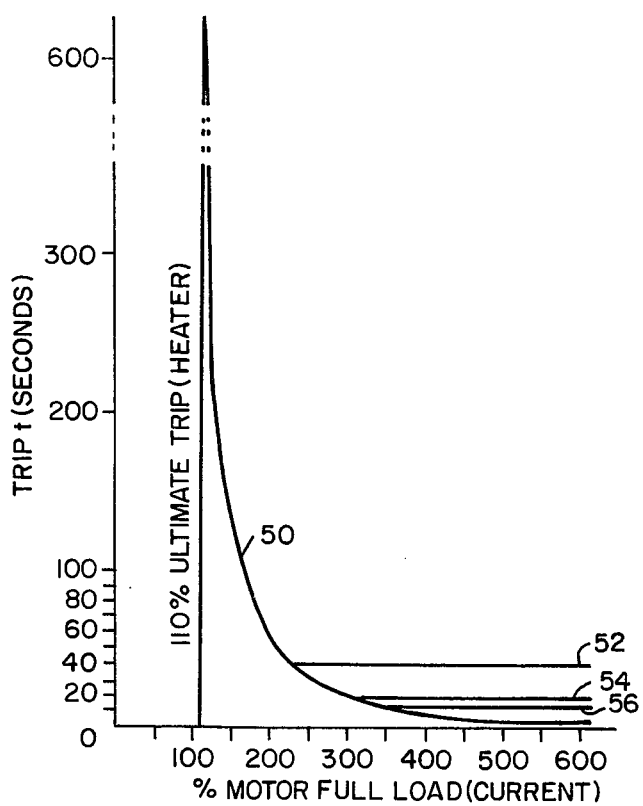
FIG. 4 shows a curve of the characteristic of a portion of the system shown in FIG. 3.

Referring now to FIG. 4, a plot of percent motor full load current versus trip time in seconds for the apparatus of FIG. 3 is shown. Under normal conditions the trip time versus percent motor full load current follows line 50. However, the utilization of a Zener diode 20 connected between the terminals 14 and 16 allows for what is generally called a long acceleration characteristic. This means that a motor or other device which takes a long period of time to accelerate where overload current such as IL may therefore exist for a long period of time will not necessarily cause tripping of the circuit breaker apparatus 45. Other circuit breaker apparatus not shown and interconnected to other portions of the lines L1, L2 and L3 will provide protection for severe overload.

Depending upon the characteristics of the Zener diode 20, the time which is allowed for the acceleration of the motor into a fairly high overload condition may be varied. As an example, if a Zener diode 20 is chosen which corresponds to line 52 of FIG. 4, a full 40 seconds of motor acceleration in the overload range may be allowed without the tripping of the circuit breaker 45. On the other hand if the Zener diode 20 is chosen with the characteristic 54 shown in FIG. 4, then a limited acceleration time of 20 seconds is allowed for the motor to reach speed before a tripping operation will occur. Also as an example, if the Zener diode 20 is chosen with the characteristic 56 shown in FIG. 4, then only 15 seconds for acceleration is allowed. The Zener diode 20 can be replaced in the field according to the overload characteristics of the apparatus being protected by the system 10'' shown in FIG. 3.

Figure 5:
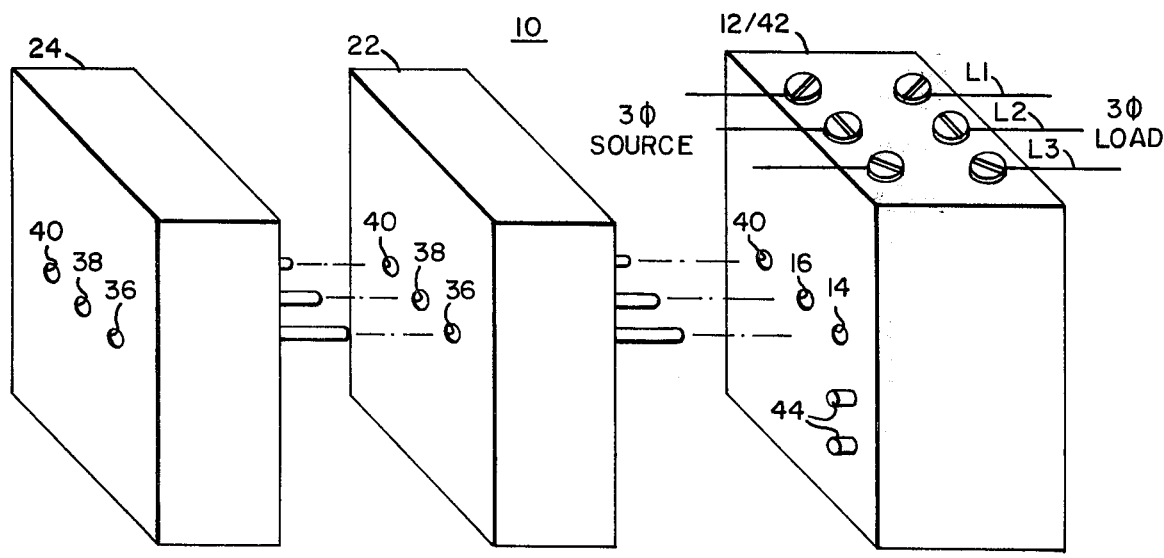
FIG. 5 shows a physical interconnecting plan for the apparatus shown in FIGS. 1 and 3.

Referring now to FIG. 5, the packaging concept utilizing the invention is shown. In this case the three-phase lines L1, L2 and L3 are shown connectable to a three-phase load on the right (not shown) and a three-phase source on the left (not shown). A module 12-42 which comprises the current sensors 12 and the output switch 42 is provided and interconnected with the lines L1, L2 and L3. Terminals 40, 16 and 14 are provided, the functions of which have been described previously with respect to the other figures. A plug-in module such as 22 which corresponds to the inverse time overload logic module shown in FIGS. 1, 2 and 3 is shown having plug-in pins interconnectable with the connectors 40, 16 and 14 of the module 12-42. A second plug-in module which may comprise the instantaneous overcurrent logic module 24 is interconnectable with other pins 40, 38 and 36 which may be on the back part of the previously described module 42. As can be seen the plug-in modules 22 and 24 may be disconnected or interplaced with each other. The module 12-42 has a set of output terminals 44 which correspond to the line 44 shown in FIGS. 1, 2 and 3. To this line may be connected a circuit breaker, not shown, but which is generally designated as 45 or 45' in FIGS. 1, 2 and 3.

It is to be understood that with respect to the embodiments of this invention that other modules than those shown in FIGS. 1, 2 and 3 may be provided at terminals 38 and 36. It is also to be understood that this circuit protective concept may be utilized with multiphase or direct current protective apparatus. It is also to be understood that the motor M shown in FIG. 3 is not limiting. It is also to be understood that the curves 52, 54 and 56 shown in FIG. 4 are not limiting and that other operating characteristics may be utilized depending upon the choice of the Zener diode means 20.

The apparatus taught in this invention has many advantages. One advantage lies in the fact that the apparatus may be utilized over a wide range of operating characteristics which may include full rated currents which vary significantly from apparatus to apparatus. Another advantage lies in the fact that the apparatus may be changed in the field or reprogrammed in the field by replacing the load resistor 18. Another advantage lies in the fact that if any of the operating modules fail, that module may be replaced without having to replace the entire system. Another advantage lies in the fact that devices such as motors which may take long periods of time to reach normal speed after start, may be utilized without causing an unnecessary tripping of the circuit breaker or motor starter 45 or 45' if the means 20 shown in FIGS. 1, 2 and 3 is utilized.

What we claim as our invention is:

1. An electrical circuit protecting device, comprising:
   sensor means for sensing circuit current in an electrical circuit, said sensor means having an output for providing an output current related to said circuit current;
   replaceable load resistor means connected to said output of said sensor means for converting said output current into a voltage the value of which is variable within a predetermined voltage range for a predetermined range of said circuit current;
   a replaceable module connected in parallel circuit relationship with said load resistor means, said module being capable of initiating a circuit breaker trip function, said module being operable over said predetermined range of said voltage; and
   circuit breaker trip means connected to said module for opening said electrical circuit when said trip function occurs in said module.

2. The combination as claimed in claim 1 wherein there are a plurality of said modules each of which is connectable in parallel circuit relationship with said load resistor means and with each other, each of which is capable of independently initiating said trip function.

3. The combination as cliamed in claim 1 wherein there is a second replaceable module which is capable of performing an indicating function, said second module being operable over said predetermined range of said voltage.

4. The combination as claimed in claim 1 wherein said replaceable module comprises an inverse time overload module.

5. The combination as claimed in claim 1 wherein said replaceable module comprises an instantaneous overcurrent module.

6. The combination as claimed in claim 1 wherein said replaceable module comprises a phase failure module.

7. The combination as claimed in claim 1 wherein said replaceable module comprises an underload logic module.

8. The combination as claimed in claim 1 wherein said replaceable module comprises a phase imbalance module.

9. The combination as claimed in claim 3 wherein said second replaceable module comprises a field test panel.

10. The combination as claimed in claim 3 wherein said second replaceable module comprises an overload condition indicator.

11. An electrical motor starter comprising:
    sensor means for sensing circuit current in an electrical circuit, said sensor means having an output for providing an output current related to said circuit current;
    replaceable load resistor means connected to said output of said sensor means for converting said output current into a voltage the value of which is variable within a predetermined voltage range for a predetermined range of said circuit current;

a replaceable module connected in parallel circuit relationship with said load resistor means, said module being capable of initiating a circuit breaker trip function, said module being operable over said predetermined range of said voltage; and circuit breaker trip means connected to said module for opening said electrical circuit when said trip function occurs in said module.

* * * * *